(12) United States Patent
Lee (10) Patent No.: US 10,907,538 B2
(45) Date of Patent: Feb. 2, 2021

(54) TWO-SPEED ACCESSORY DRIVE PULLEY

(71) Applicant: SCHAEFLER TECHNOLOGIES AG & CO. KG, Herzogenaurach (DE)

(72) Inventor: Brian Lee, York, SC (US)

(73) Assignee: SCHAEFLER TECHNOLOGIES AG & CO. KG, Herzogenaurach (DE)

( * ) Notice: Subject to any disclaimer, the term of this patent is extended or adjusted under 35 U.S.C. 154(b) by 525 days.

(21) Appl. No.: 15/861,220

(22) Filed: Jan. 3, 2018

(65) Prior Publication Data

US 2019/0203637 A1 Jul. 4, 2019

(51) Int. Cl.
| | |
|---|---|
| *F02B 67/06* | (2006.01) |
| *B60K 25/02* | (2006.01) |
| *F16H 13/06* | (2006.01) |
| *F16H 55/54* | (2006.01) |
| *F16H 55/52* | (2006.01) |
| *F16D 41/06* | (2006.01) |
| *F16H 55/36* | (2006.01) |

(52) U.S. Cl.
CPC .............. *F02B 67/06* (2013.01); *B60K 25/02* (2013.01); *F16D 41/06* (2013.01); *F16H 13/06* (2013.01); *F16H 55/52* (2013.01); *F16H 55/54* (2013.01); *B60K 2025/022* (2013.01); *F02B 2275/06* (2013.01); *F16H 55/36* (2013.01)

(58) Field of Classification Search
CPC .... F16H 55/36; F16H 2055/366; F16H 55/52; F16H 55/54; F16H 55/56; F16H 13/00; F16H 13/06; F16H 13/10; F16H 15/48; F16H 15/56; F16H 2200/2005; F16H 2200/2035; F16H 2200/2033; F16H 2200/2066; F16H 2200/2082; B60K 25/00; B60K 25/02; B60K 2025/022; B60K 2025/024; F02B 67/06; F16D 41/06; F16D 41/061; F16D 41/063; F16D 41/07; F16D 41/073; F16D 2041/0606; F16D 2041/0646
USPC .......................................................... 474/70
See application file for complete search history.

(56) References Cited

U.S. PATENT DOCUMENTS

| | | | |
|---|---|---|---|
| 5,122,099 A | 6/1992 | Boedo et al. | |
| 7,931,552 B2* | 4/2011 | Pendergrass | ............ F16D 41/22 474/74 |
| 8,529,387 B2* | 9/2013 | Lannutti | ................. F16D 41/22 474/74 |
| 2005/0148417 A1* | 7/2005 | Garabello | ............... F02B 63/04 474/70 |
| 2009/0291794 A1* | 11/2009 | Amanuma | ............ F16D 41/088 474/171 |

(Continued)

*Primary Examiner* — Michael R Mansen
*Assistant Examiner* — Raveen J Dias
(74) *Attorney, Agent, or Firm* — Brooks Kushman P.C.

(57) ABSTRACT

An accessory drive pulley assembly is configured to transfer rotational power from an engine crankshaft to one or more vehicle accessories. The accessory drive pulley has an inner race rotatable about an axis and having an outer surface. An outer race is located radially outward from the inner race and has an inner surface facing the inner race. A wedge plate is located radially between the outer surface and the inner surface. The wedge plate is configured to expand and contract radially to selectively lock and unlock the inner race with the outer race. When locked, an associated pulley can rotate at a different speed than when unlocked.

20 Claims, 6 Drawing Sheets

(56) References Cited

U.S. PATENT DOCUMENTS

| | | | |
|---|---|---|---|
| 2010/0122882 A1* | 5/2010 | Komorowski | F16D 27/105 192/35 |
| 2010/0151979 A1* | 6/2010 | Baer | F16H 55/36 474/199 |
| 2011/0053729 A1* | 3/2011 | Parsons | F16H 3/54 475/297 |
| 2011/0281678 A1* | 11/2011 | Cali | F16D 3/02 474/171 |
| 2013/0161150 A1* | 6/2013 | McCrary | F16D 13/76 192/41 R |
| 2013/0313068 A1* | 11/2013 | Mevissen | B60K 25/00 192/810 |
| 2014/0031156 A1* | 1/2014 | Graves | B60K 25/02 474/71 |
| 2014/0274506 A1* | 9/2014 | Lannutti | F16H 55/36 474/70 |
| 2015/0285317 A1* | 10/2015 | Lannutti | F16D 41/061 192/41 R |
| 2016/0230876 A1* | 8/2016 | Zhang | F16H 3/58 |
| 2017/0059008 A1* | 3/2017 | Kashyap | F02B 39/16 |
| 2017/0174048 A1* | 6/2017 | Eisenhour | F02B 67/06 |
| 2017/0254366 A1* | 9/2017 | Antchak | F16H 55/36 |
| 2018/0187727 A1* | 7/2018 | Hornbrook | F16H 3/006 |
| 2018/0195562 A1* | 7/2018 | Gopal | F16D 43/18 |
| 2019/0056021 A1* | 2/2019 | Lee | F16H 55/36 |
| 2019/0301573 A1* | 10/2019 | Hrusch | F02B 67/06 |
| 2020/0003113 A1* | 1/2020 | Hrusch | F16H 1/2863 |
| 2020/0136491 A1* | 4/2020 | Kim | F16H 3/74 |

\* cited by examiner

TWO-SPEED ACCESSORY DRIVE PULLEY

TECHNICAL FIELD

The present disclosure relates to an accessory drive pulley assembly for an automotive engine.

BACKGROUND

It is known in the automotive industry to mount various engine drive accessories, such as a generator/alternator, power steering pump, air conditioning compressor, engine water pump, exhaust air pump, etc. to the front of the engine. Power from the engine transfers to these accessories in what is known as a front end accessory drive (FEAD) system. In one example of a FEAD system, a crank pulley is mounted to the engine crankshaft, and one or more of the various drive accessories are mounted to a common belt that rotates as the crank pulley rotates. The belt can be wrapped in a serpentine fashion, and either one or both sides of the belt can turn pulleys that power the various drive accessories. Multiple belts can be provided to each power multiple pulleys, and in turn, multiple drive accessories.

SUMMARY

According to one embodiment, an accessory drive pulley assembly includes a housing, an inner race located within the housing, and an outer race fixed to the housing and disposed radially outward from the inner race. The inner race is rotatable about an axis and has an outer surface with a groove. A wedge plate is disposed radially between the inner race and the outer race, the wedge plate being configured to radially expand and contract to selectively lock and unlock the inner race with the outer race. A pulley is included. An actuator is selectively coupled to the wedge plate and is configured to selectively enable the radial expansion and contraction of the wedge plate. The actuator is moveable between a first position in which the wedge plate slips in the groove such that the inner race rotates relative to the outer race to enable the pulley to rotate at a first speed, and a second position enabling the wedge plate to contract in the groove to lock the outer race with the inner race and enable the pulley to rotate at a second speed.

In another embodiment, an accessory drive pulley assembly includes a housing, and a planetary gear set disposed in the housing. The gear set includes a sun gear rotatable about an axis and selectively held against rotation, a carrier rotatable about an axis and configured to rotate along with an engine crankshaft, and a ring gear being a pulley configured to move an accessory drive belt. An outer race is disposed radially outward from the sun gear and is fixed to the housing. An annular wedge plate is disposed along an inner surface of the outer race, and has an inner profile configured to radially expand or contract to selectively hold the sun gear against rotation relative to the outer race to enable the ring gear to rotate at an overdrive speed.

In yet another embodiment, an accessory drive pulley assembly is configured to transfer rotational power from an engine crankshaft to one or more accessories. The accessory drive pulley includes an inner race rotatable about an axis and having an outer surface, and an outer race located radially outward from the inner race and having an inner surface. A wedge plate is located radially between the outer surface and the inner surface. The wedge plate is configured to expand and contract radially to selectively lock and unlock the inner race with the outer race.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It should be understood that terms such as "inner," "outer," "axial," and "radial" as used herein are relative to a central axis that the accessory drive pulley assembly is rotatable about. For example, if a component has an inner surface and an outer surface, the inner surface is one that faces toward the central axis, and the outer surface is one that faces away from the central axis. An axial direction is parallel to a central axis, and a radial direction is orthogonal to the central axis.

Many automotive engines are equipped with an FEAD system, such as the one described above in the Background. The engine may have a main pulley (also referred to herein as a crank pulley or accessory drive pulley) that is mounted to the engine's crankshaft such that it rotates as the crankshaft rotates. The crank pulley can turn a belt (or other such power-transferring mechanism) which turns one or more other pulleys. These other pulleys (also referred to as accessory pulleys) can power a generator/alternator, power steering pump, air conditioning compressor, engine water pump, exhaust air pump, etc.

It may be desirable to have an accessory drive pulley with multiple speed capabilities. For example, when the engine speed is low, it may be desirable to spin the accessory drive pulley at a faster speed. This may be particularly beneficial in a hybrid vehicle in which large components driven by the FEAD system may demand a high amount of rotational speed from its associated pulley.

According to various examples and embodiments of the present disclosure described herein, a two-speed accessory drive pulley with a wedge clutch is disclosed. The wedge clutch is integrated into the accessory drive pulley to enable the accessory drive pulley to rotate at a second (overdrive) speed. A second wedge clutch can also be implemented, acting as a one-way clutch.

Figure 1:
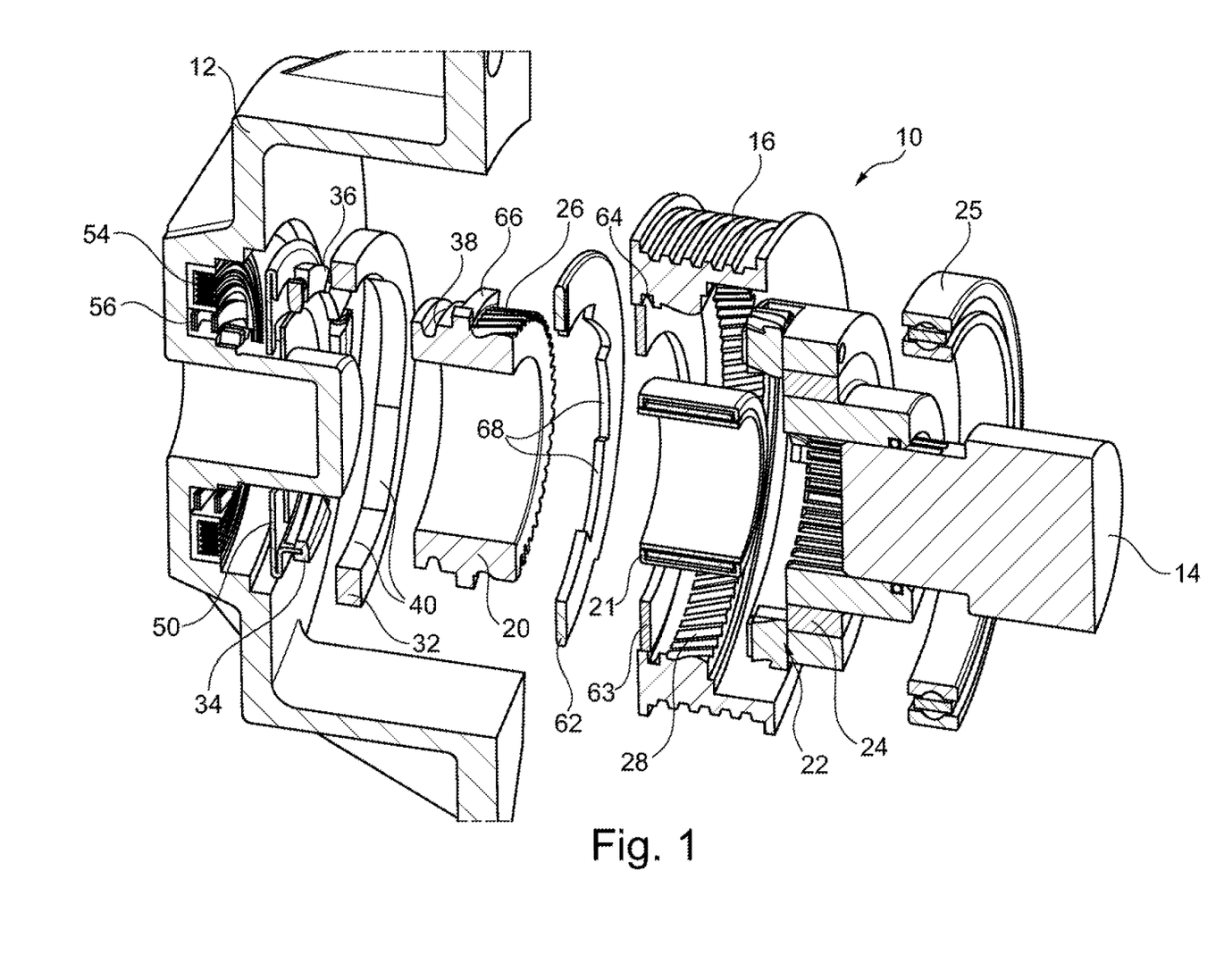
FIG. 1 is an exploded perspective view of an accessory drive pulley assembly, according to one embodiment.
Figure 2:
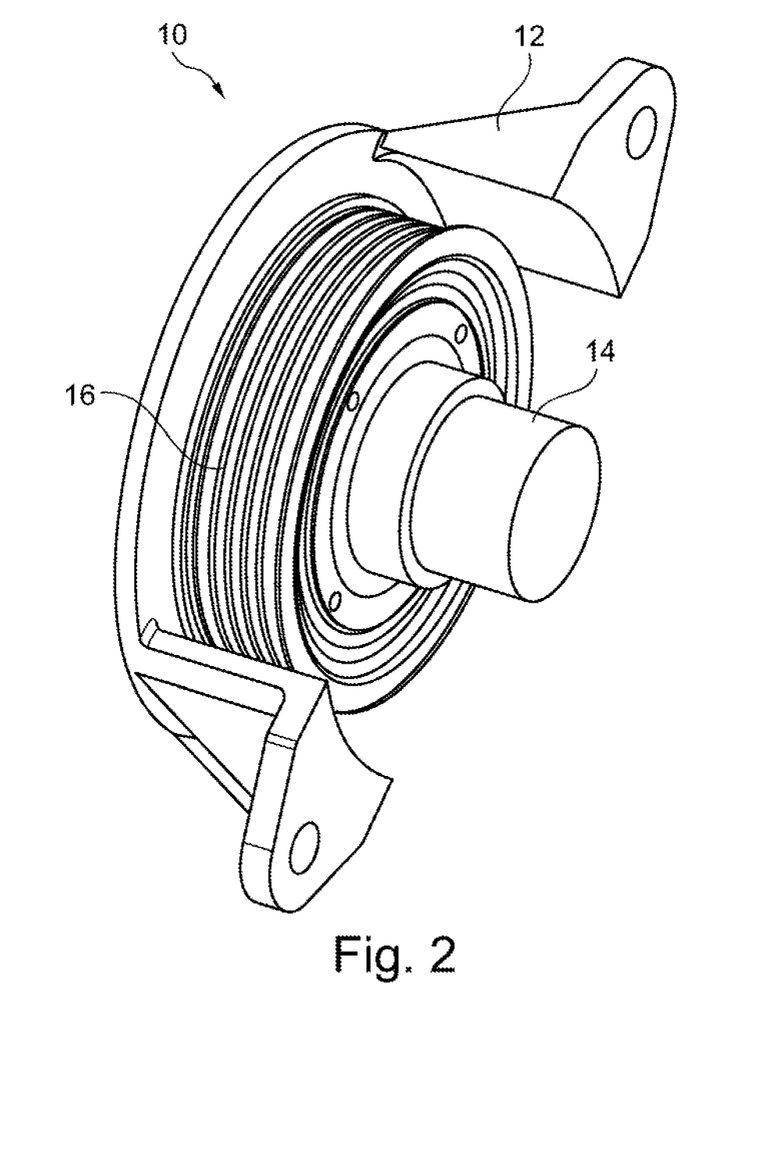
FIG. 2 is a perspective view of the accessory drive pulley assembly of FIG. 1 assembled about an engine crankshaft, according to one embodiment.
Figure 3:
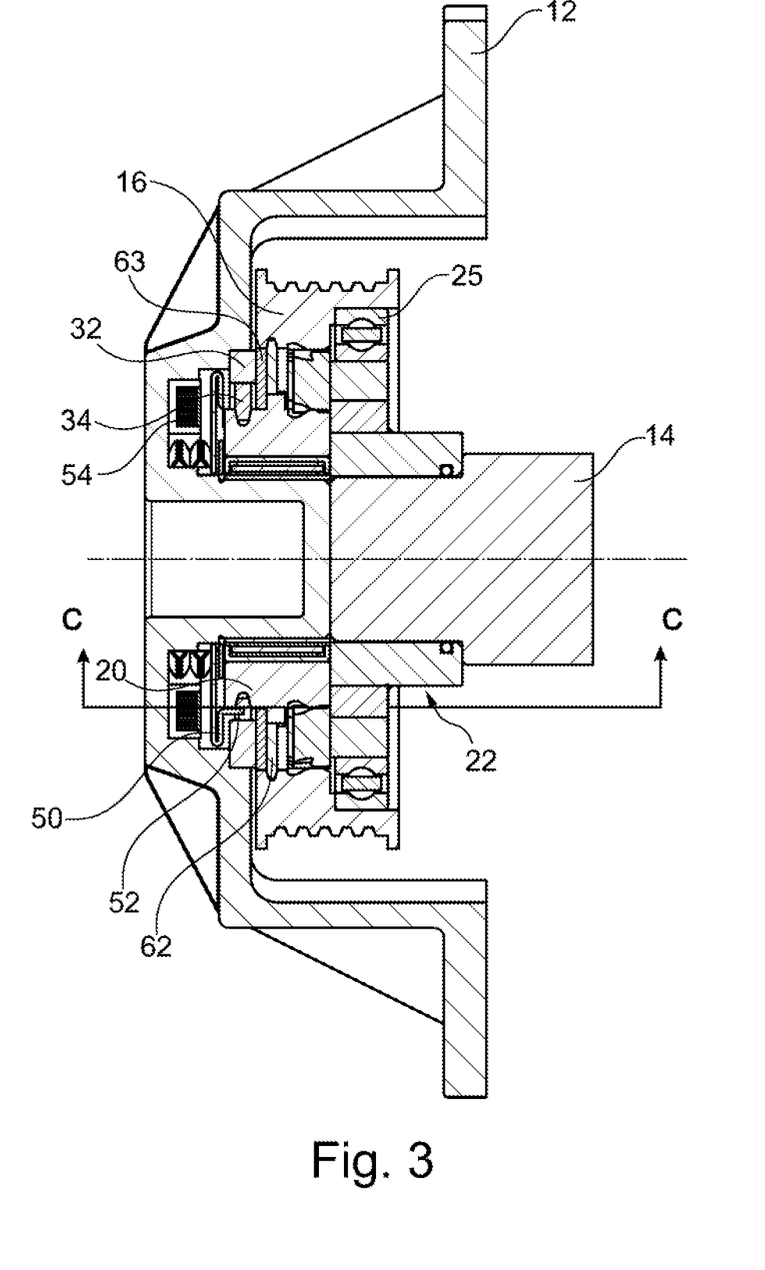
FIG. 3 is a cross-sectional view of the accessory drive pulley assembly assembled about an engine crank shaft, according to one embodiment.
Figure 4:
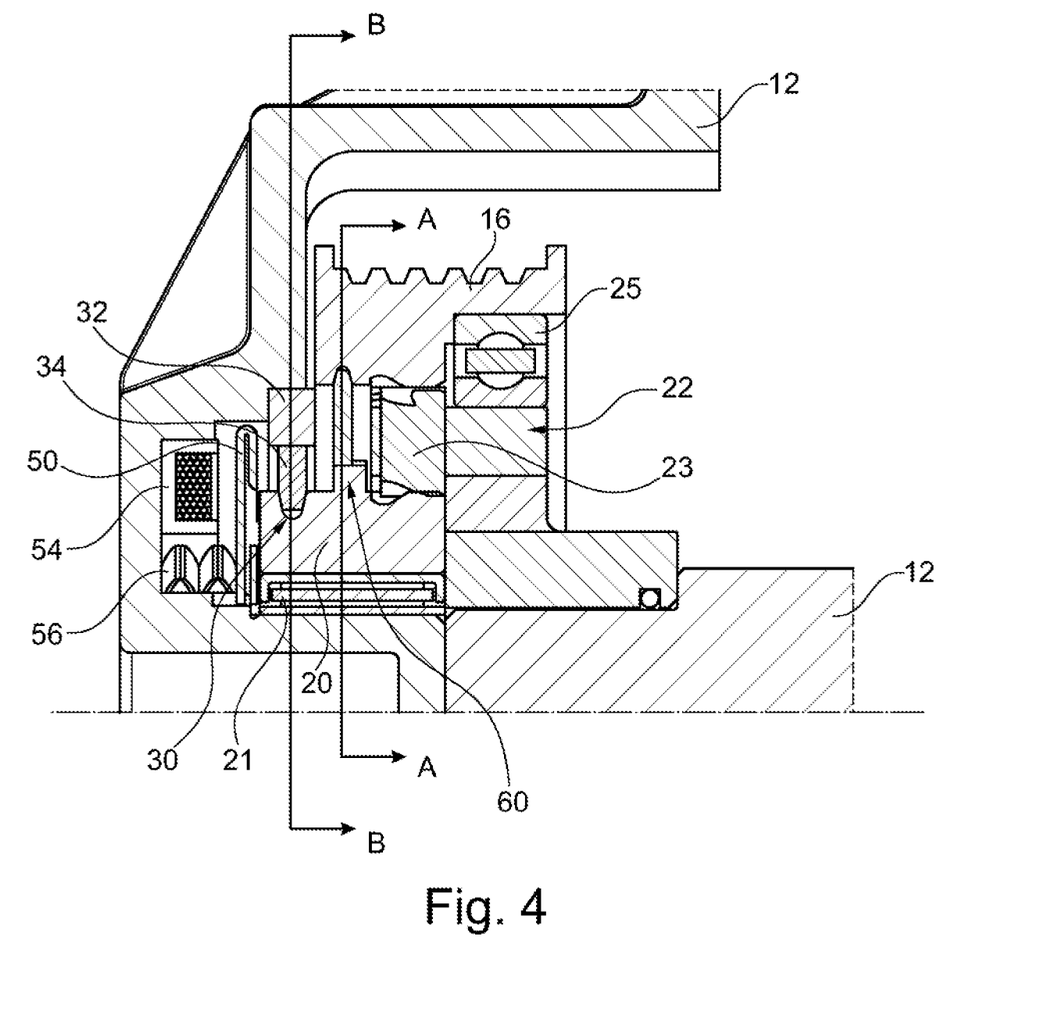
FIG. 4 is an enlarged cross-sectional view of a half of the accessory drive pulley assembly of FIG. 3 above a central axis, according to one embodiment.
Figure 5A:
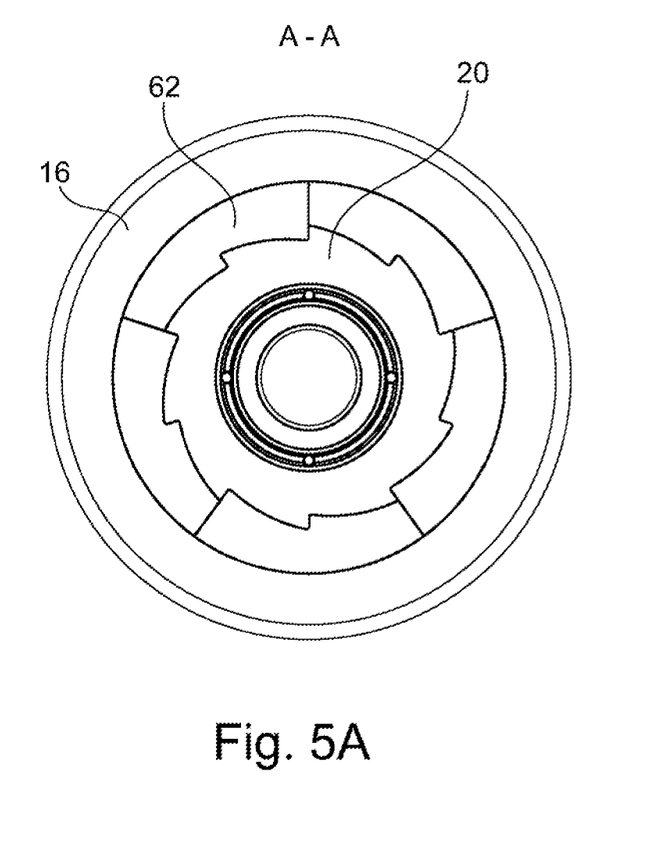
FIG. 5A is a front sectional view taken along line A-A of FIG. 4.
Figure 5B:
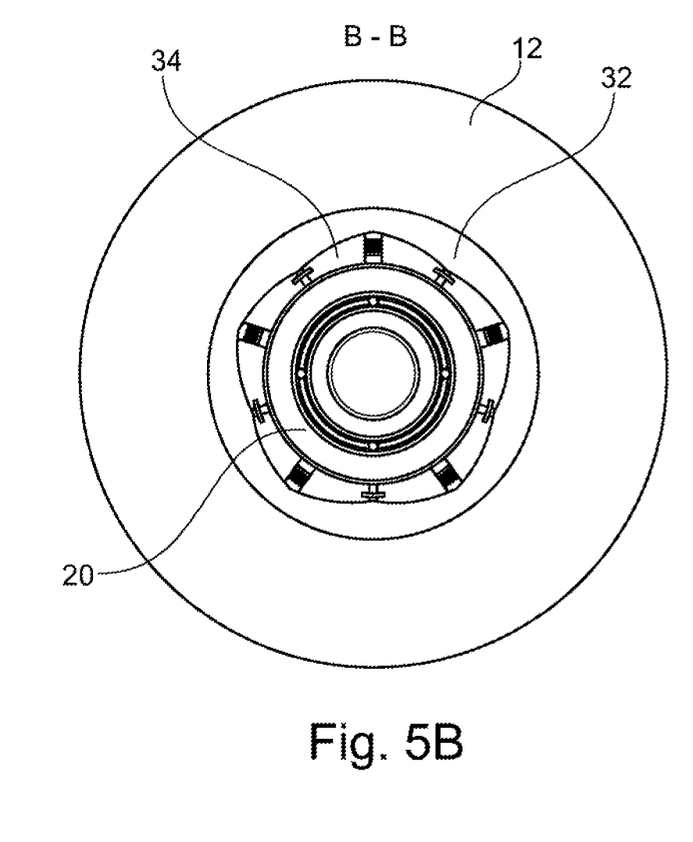
FIG. 5B is a front sectional view taken along line B-B of FIG. 4.
Figure 5C:
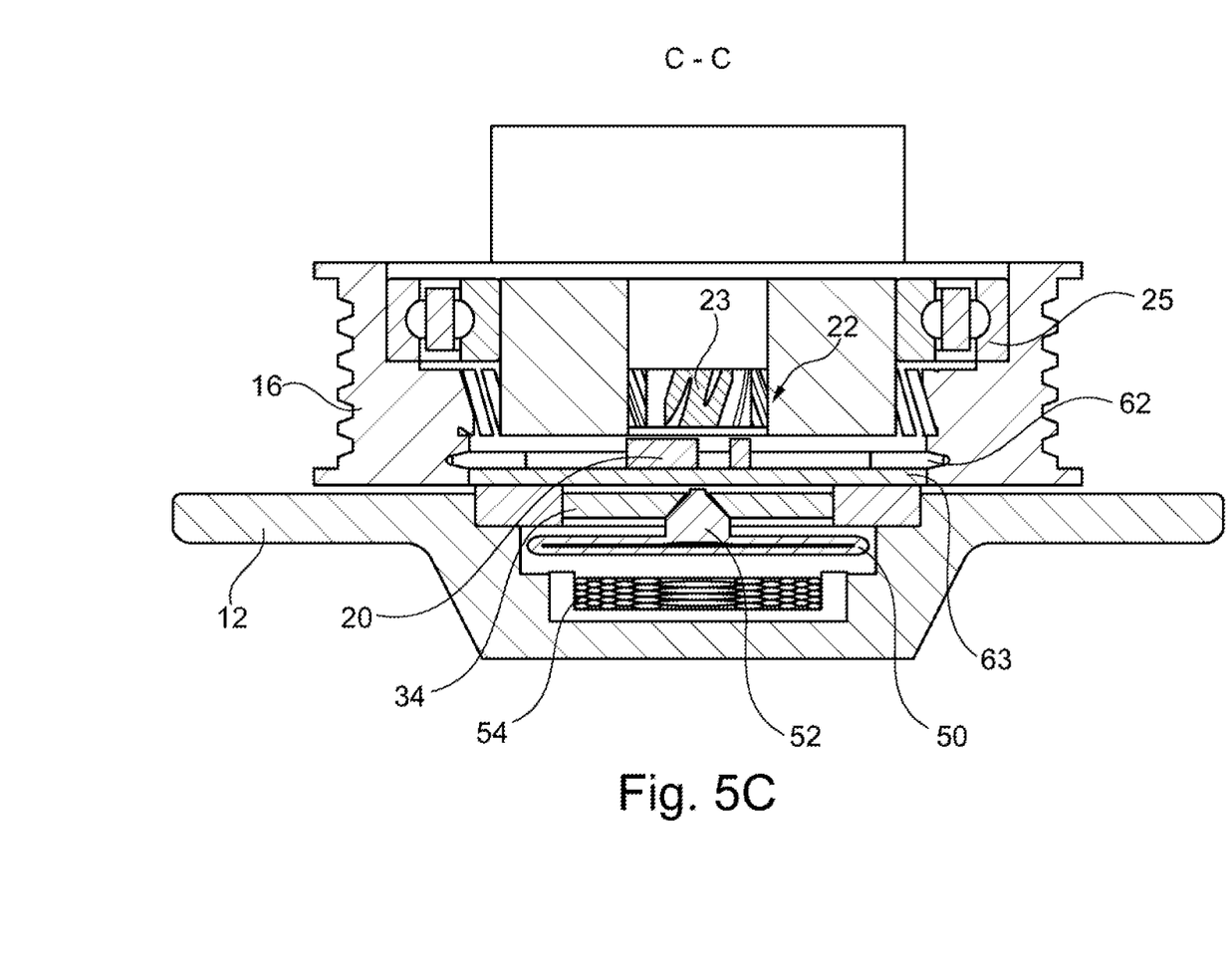
FIG. 5C is a front sectional view taken along line C-C of FIG. 3.

Referring to the Figures, an accessory drive pulley (or crank pulley) assembly is shown in various views according to an embodiment. The accessory drive pulley assembly 10 is rotatable about a central axis. The accessory drive pulley assembly 10 is shown in an exploded view in FIG. 1, in an assembled view in FIG. 2, and in a cross-sectional view in FIGS. 3 and 4. The accessory drive pulley assembly 10 includes a housing 12, also referred to as a coil support. The accessory drive pulley assembly 10 is configured to secure to a crankshaft 14 such that rotational movement of the engine's crankshaft 14 turns a pulley 16 (also referred to as a ring gear, as explained below). Turning of the pulley 16 enables a belt or the like (not shown) to turn other accessory pulleys to power various accessories.

Along with the wedge clutches that will be described below, the assembly 10 includes a planetary gear set to provide a speed ratio between the input (from crankshaft 14) to the output (pulley 16). The planetary gear set includes a sun gear 20, also referred to as an inner race or inner hub. The sun gear 20 is rotatably coupled to a central portion of the housing 12 about a bearing 21. The planetary gear set also includes a carrier 22 including a carrier gear 23 and a connected damper 24 (e.g., rubber) for dampening vibration and isolating engine piston firing shock. The carrier 22 mates with the crankshaft 14, and the carrier gear 23 rotates the pulley 16, which acts as the ring gear of the planetary gear set. A pulley bearing 25 rotatably connects the pulley 16 to the planetary carrier 22. In sum, the planetary gear set includes a sun gear or inner race 20, a carrier 22, and a ring gear or pulley 16. This provides a speed ratio between the crankshaft 14 and the pulley 16 so that the speed of the belt is proportional (but not equivalent) to the speed of the crankshaft 14.

To transfer rotational movement from the sun gear to the ring gear of the planetary gear set, the inner race 20 includes an outer surface (i.e., facing away from the central axis) that includes plurality of teeth 26 that mesh with corresponding teeth of the carrier gear 23. Likewise, the pulley 16 includes an inner surface (i.e., facing the central axis) that includes a plurality of teeth 28 that mesh with the teeth of the carrier gear 23.

A switchable wedge clutch 30 is provided within the accessory drive pulley assembly 10. The switchable wedge clutch includes the inner race 20, an outer race 32, and a wedge plate 34. The outer race 32 is fixed or mounted to the housing 12 such that the housing and outer race 32 (a) both do not rotate, and/or (b) rotate together. The wedge plate 34 may include a plurality of wedge segments 36 bound together about the central axis via a spring or the like. Alternatively, the wedge plate 34 may be a single annular plate. The wedge plate 34 includes an outer surface that contacts the outer race 32, and an inner surface that is tapered or narrowed. The outer surface of the inner race 20 includes a corresponding groove 38 sized and shaped to receive the tapered inner surface of the wedge plate 34.

The wedge clutch 30 enables the FEAD system and its accessory drive pulley assembly to operate in two speeds, namely a normal speed and an overdrive speed. To change between the two speeds, the wedge plate 34 of the wedge clutch 30 is radially expandable and contractible to selectively engage and disengage the outer race 32 with the inner race 20. In a first, disengaged position, the wedge plate 34 rotates with the outer race 32 but can spin freely relative to the inner race 20. In the disengaged position, the tapered inner end of the wedge plate 34 does not contact the surfaces of the groove 38. Thus, the inner race 20 can spin relative to the housing 12. Via the carrier 22, this creates a normal speed of the accessory drive pulley assembly and the associated belt (not shown) is translated at a first speed. In a second, engaged position, the tapered inner end of the wedge plate contacts the groove 38 of the inner race 20. This locks the inner race 20 to the outer race 32, grounding the inner race to the housing 12. In other words, this grounds the sun gear of the planetary gear set. Grounding of the sun gear 20 creates an overdrive ratio to the pulley or ring gear 16. Via the carrier 22, this creates an overdrive speed of the accessory drive pulley assembly and the associated belt (not shown) is translated at a second, faster speed.

As mentioned, the wedge plate 34 radially expands and contracts into and out of the groove 38. The wedge plate 34 may have separate wedge segments that can move circumferentially relative to one another to expand and contract the circumferential profile of the wedge plate 34. In another embodiment, the wedge plate is a single plate with cut-outs, slits, grooves, or the like that enable the plate to expand and contract. To accomplish the radial expansion and contraction of the wedge plate 34, the inner surface of the outer race 32 is provided with a plurality of ramped surfaces 40. The outer surface of the wedge plate 34 may be correspondingly tapered. The wedge plate 34 is rotatable about the axis relative to the outer race 32. Upon actuation from an actuator (described below), the wedge plate 34 can move circumferentially relative to the outer race, which cases the outer surface of the wedge plate to slide along the ramped surfaces 40 of the outer race. This forces the wedge plate to either expand or contract radially.

In one example, each ramped surface 40 may slope such that a portion of each ramped surface is at a first radial distance from the central axis, and another portion of that ramped surface is at a second radial distance further than the first radial distance.

An actuator cage 50, also referred to as an actuator, may be provided for rotating the wedge plate 34 relative to the outer race 32, thereby engaging and disengaging the wedge plate 34 with the inner race 20. The actuator 50 may be referred to as a "cage" because it may encircle the wedge plate 34 and engage various locations of the wedge plate about the central axis. The actuator 50 may have an axially-extending portion 52 that selectively contacts and releases from the wedge plate 34. The actuator 50 is powered by electric coils 54 which, when energized, pull the actuation cage 50 out of engagement with the wedge plate 34 against a biasing force provided by springs 56. In other words, the springs 56 bias the actuator 50 in one axial direction (e.g., to the right in FIGS. 1, 3 and 4) which engages the wedge plate 34 to force the wedge plate in an expanded position which keeps the outer race unlocked from the inner race. This allows the accessory drive pulley to operate in the normal speed due to the outer race 32 being disengaged from the inner race 20, as described above. When the faster overdrive speed is required, the electric coils 54 are energized, which pulls the actuator 50 and its axially-extending portion 52 out of engagement with the wedge plate 34. This allows the wedge clutch 30 to lock wherein the outer race 32 forces the wedge plate 34 to its constricted state, engaging with the groove 38 of the inner race 20.

The accessory drive pulley assembly 10 may also include a second wedge clutch that acts as a one-way clutch. This is referred to as a wedge one-way clutch (WOWC) 60, or one-way wedge clutch. Like the wedge clutch 30, the WOWC 60 includes an inner race (e.g., the inner race 20), an outer race (e.g., the pulley 16), and a wedge plate 62. Like the wedge plate 34, the wedge plate 62 for the WOWC may be a single-piece wedge plate with slits or grooves for expanding or contracting, or may be a plurality of wedge segments connected to one another about the central axis via springs, clips, etc. Also like the wedge clutch 30, in the WOWC 60 the pulley may have an inner surface defining a groove 64 for receiving a tapered outer end of the wedge plate 62. A washer 63 rests axially between the WOWC 60 and the wedge clutch 30.

The outer surface of the inner race 20 may include ramped surfaces 66 that mate or engage with corresponding ramped surfaces 68 on the inner surface of the wedge plate 62. The WOWC 60 acts as a one-way clutch when the ramped surfaces 66, 68 slide along each other to force the wedge plate 62 into and out of engagement with the groove 64 of the pulley 16. When the wedge plate 62 is engaged with the pulley 16, the pulley 16 and the inner race 20 rotate together.

The WOWC 60 can ensure that the inner race 20 (i.e., sun gear) does not spin faster than the outer race 16 (i.e., pulley). The wedge plate 62 expands to lock the inner race 20 with the pulley 16 when the pulley 16 is not rotating faster than the inner race 20. And, the wedge plate 62 contracts to disengage from the pulley 16 when the pulley 16 is rotating faster than the inner race 20. In other words, when the pulley 16 is not rotating faster than the inner race 20 (i.e., the relative motion is such that the inner race 20 is trying to spin faster than the pulley 16), the WOWC 60 automatically locks. When the inner race 20 slows down (or the pulley 16 speeds up), then the wedge plate 62 releases from the pulley 16 and spins freely, allowing the pulley 16 to rotate faster than the inner race 20.

When the WOWC 60 is locked, the entire planetary gear set rotates together without a ratio, and at the normal speed (e.g., direct drive, 1:1 ratio) for the two-speed accessory drive pulley. When the second (overdrive) speed is desired, the coils 54 activate to pull the actuator 50 out of engagement, allowing the switchable wedge clutch 30 to lock to ground the inner race 20, thus creating an overdrive ratio between the inner race 20 (sun gear) and the pulley 16 (ring gear).

It should be understood that the illustrated embodiments are merely examples of one type of wedge clutch. In another embodiment not shown, the wedge clutch 30 is reversed such that the groove is provided on the outer race 32, and the wedge plate expands to engage with the outer race 32 to lock the wedge clutch 30. Similarly, the WOWC 60 may have its wedge plate 62 reversed such that the tapered end of the plate 62 is on the inner surface of the wedge plate, and a groove is provided in the inner race instead of the pulley such that contraction of the wedge plate 62 locks the pulley 16 to the inner race. Relocation of the ramped surfaces would be necessary in such an embodiment, such that the outer surface of the inner race 20 would provide the ramped surface for the wedge clutch 30, and the inner surface of the pulley 16 would provide the ramped surfaces for the WOWC 60.

The teachings above provide a compact, low-mass solution for a multi-speed accessory drive pulley. Wedge clutches with electromagnetic actuation provide the compact, low-mass solution that other multi-speed accessory drive pulleys fail to provide. The wedge clutch implemented into the accessory drive pulley can replace a roller one-way clutch, allowing for a more torque-dense system with a smaller axial packaging space. Also, replacing a friction-based cone clutch or band clutch with a switchable wedge clutch such as those described above allows for much smaller actuation forces, and thus smaller electromagnetic coils.

In the embodiments shown in the Figures, the parts shown are as follows:
  10 accessory drive pulley assembly
  12 housing
  14 engine crankshaft
  16 pulley
  20 sun gear
  22 carrier
  23 carrier gear
  24 damper
  25 pulley bearing
  26 teeth
  28 teeth
  30 switchable wedge clutch
  32 outer race
  34 wedge plate
  36 wedge segments
  38 groove
  40 ramped surfaces
  50 actuator cage
  52 axially-extending portion
  54 electric coils
  56 springs
  60 wedge one-way clutch (WOWC)
  62 wedge plate
  63 washer
  64 groove
  66 ramped surfaces
  68 ramped surfaces While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An accessory drive pulley assembly comprising:
    a housing;
    an inner race located within the housing, rotatable about an axis and having an outer surface with a groove;
    an outer race fixed to the housing and disposed radially outward from the inner race;
    a wedge plate disposed radially between the inner race and the outer race, the wedge plate configured to radially contract and expand to selectively lock and unlock, respectively, the inner race with the outer race;
    a pulley; and
    an actuator selectively coupled to the wedge plate and configured to selectively enable the radial expansion and contraction of the wedge plate;
    wherein the actuator is moveable between
        a first position in which the wedge plate slips in the groove such that the inner race rotates relative to the outer race to enable the pulley to rotate at a first speed, and
        a second position enabling the wedge plate to contract in the groove to lock the outer race with the inner race and enable the pulley to rotate at a second speed.

2. The accessory drive pulley of claim 1, further comprising coils configured to, when energized, move the actuator from the second position to the first position.

3. The accessory drive pulley of claim 1, further comprising a one-way clutch (OWC) wedge plate, the OWC wedge plate configured to expand and contract radially to selectively lock the inner race with the pulley.

4. The accessory drive pulley of claim 3, wherein the OWC wedge plate expands to lock the inner race with the pulley when the pulley is not rotating faster than the inner race, and wherein the OWC wedge plate contracts to disengage the inner race from the pulley when the pulley is rotating faster than the inner race.

5. An accessory drive pulley assembly comprising:
    a housing;
    a planetary gear set disposed in the housing and including:
        a sun gear rotatable about an axis and selectively held against rotation,
        a carrier rotatable about an axis and configured to rotate along with an engine crankshaft, and
        a ring gear being a pulley configured to move an accessory drive belt;
    an outer race disposed radially outward from the sun gear and fixed to the housing; and
    an annular wedge plate disposed along an inner surface of the outer race, the annular wedge plate having an inner profile configured to radially expand or contract to selectively hold the sun gear against rotation relative to the outer race to enable the ring gear to rotate at an overdrive speed.

6. The accessory drive pulley of claim 5, wherein the sun gear includes an outer surface with a groove, and the annular wedge plate includes an inner surface with a tapered end configured to be received within the groove when holding the sun gear against rotation.

7. The accessory drive pulley of claim 6, further comprising an actuator disposed within the housing and configured to translate axially between:
    a first position in which the annular wedge plate slips in the groove such that the sun gear rotates relative to the outer race to enable the ring gear to rotate at a first speed, and
    a second position enabling the wedge plate to contract in the groove to lock the outer race with the sun gear and enable the ring gear to rotate at the overdrive speed.

8. The accessory drive pulley of claim 7, further comprising coils disposed within the housing and configured to, when energized, translate the actuator from the second position to the first position.

9. The accessory drive pulley of claim 5, further comprising a one-way clutch (OWC) wedge plate radially disposed between the sun gear and the ring gear.

10. The accessory drive pulley of claim 9, wherein the OWC wedge plate is configured to radially expand and contract to selectively lock the sun gear with the ring gear.

11. The accessory drive pulley of claim 10, wherein the ring gear has an inner surface with a groove, and the OWC wedge plate has an outer surface with a tapered end configured to be received within the groove to lock the sun gear with the ring gear.

12. The accessory drive pulley of claim 9, wherein the OWC wedge plate locks the ring gear with the sun gear when a rotational speed of the sun gear approaches a rotational speed of the ring gear such that the sun gear is inhibited from rotating faster than the ring gear, and wherein the OWC wedge plate spins freely with respect to the ring gear when the sun gear spins slower than the ring gear.

13. An accessory drive pulley assembly configured to transfer rotational power from an engine crankshaft to one or more accessories, the accessory drive pulley assembly comprising:
    an inner race rotatable about an axis and having an outer surface;
    an outer race located radially outward from the inner race and having an inner surface; and
    a wedge plate located radially between the outer surface and the inner surface, the wedge plate configured to expand and contract radially to selectively lock and unlock the inner race with the outer race.

14. The accessory drive pulley assembly of claim 13, wherein the outer surface of the inner race includes a tapered groove, and the wedge plate includes a tapered inner surface configured to be received within the tapered groove to lock the outer race with the inner race.

15. The accessory drive pulley assembly of claim 13, further comprising an actuator coupled to the wedge plate and configured to translate axially to enable the wedge plate to contract and lock the inner race with the outer race.

16. The accessory drive pulley assembly of claim 15, further comprising an electric coil that powers the actuator, wherein the actuator is biased in a first linear position that maintains the wedge plate in an expanded state such that the inner race is not locked with the outer race, and energizing of the electric coil moves the actuator linearly to a second linear position decoupled from the wedge plate to allow the wedge plate to contract radially and engage with the outer surface of the inner race to lock the inner race and outer race.

17. The accessory drive pulley assembly of claim 13, wherein the inner race is rotatably coupled to the engine crankshaft.

18. The accessory drive pulley assembly of claim 13, further comprising a pulley configured to rotate about the axis to translate an associated belt, wherein the pulley is located radially outward of the inner race.

19. The accessory drive pulley assembly of claim 18, further comprising a one-way clutch (OWC) wedge plate, the OWC wedge plate configured to expand and contract radially to selectively lock the inner race with the pulley.

20. The accessory drive pulley assembly of claim 18, wherein the OWC wedge plate expands to engage with the pulley when a rotational speed of the inner race approaches a rotational speed of the pulley to rotatably lock the inner race with the pulley, and wherein the OWC wedge plate contracts to disengage from the pulley when the rotational speed of the inner race reduces relative to the rotational speed of the pulley.

\* \* \* \* \*